Sept. 7, 1926.  1,599,357
A. J. AUSPITZER
APPARATUS FOR USE IN MAKING CONNECTIONS BETWEEN THE
ENDS OF CABLES AND THE LIKE
Original Filed July 9, 1923
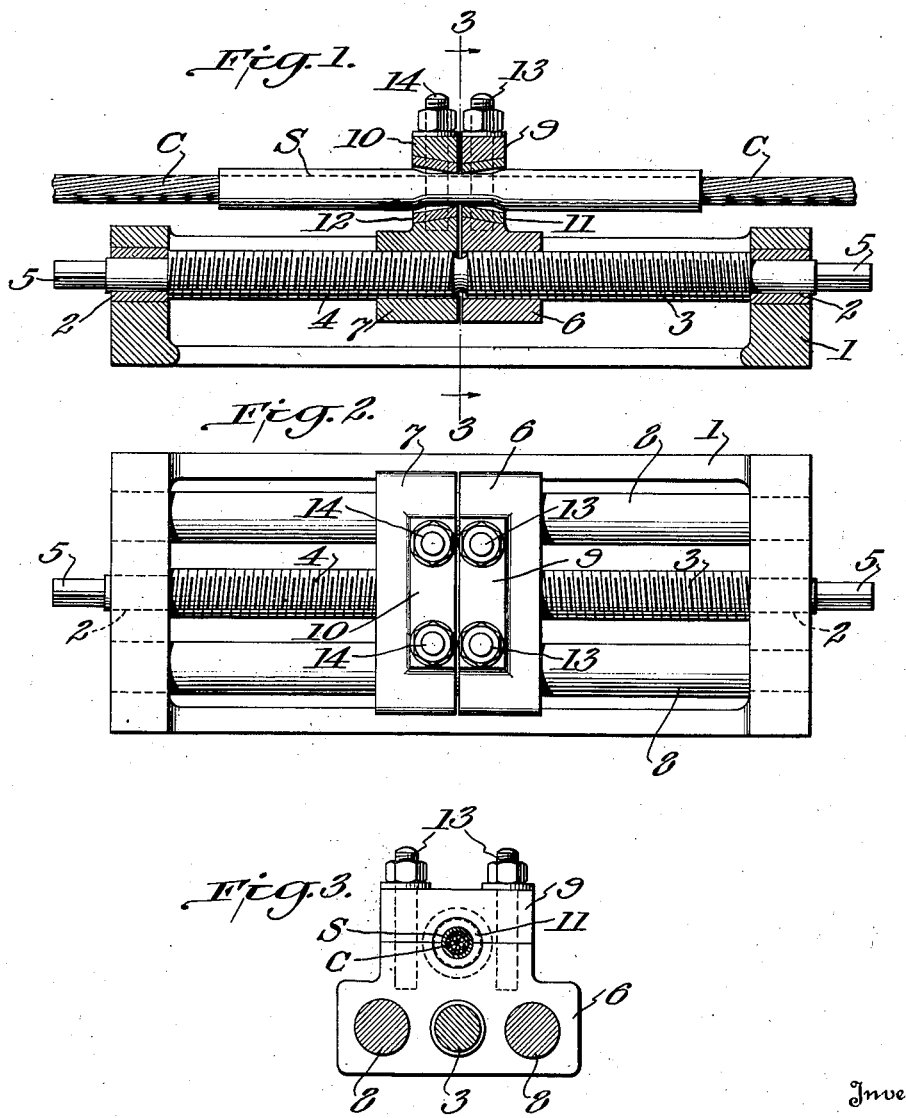

Patented Sept. 7, 1926.

1,599,357

UNITED STATES PATENT OFFICE.

ALFRED JOHANN AUSPITZER, OF FRANKFORT-ON-THE-MAIN, GERMANY, ASSIGNOR, BY MESNE ASSIGNMENTS, TO TRAHO METALLIC JOINT CORPORATION, OF NEW YORK, N. Y., A CORPORATION OF NEW YORK.

APPARATUS FOR USE IN MAKING CONNECTIONS BETWEEN THE ENDS OF CABLES AND THE LIKE.

Original application filed July 9, 1923, Serial No. 650,262, and in Germany August 12, 1922. Divided and this application filed December 5, 1925. Serial No. 73,382.

This application is a division of application Serial Number 650,262, filed July 9, 1923, and entitled "Method of making connections in cables and the like".

The present invention relates to apparatus for use in making connections between the ends of rods, tubes, wires, ropes and the like, and particularly to a tube-drawing device for such use.

For convenience of description, the term "bodies such as cables" will be employed throughout the following description and claims to designate the rods, tubes, cables, wires or the like which may be connected by the novel apparatus.

In accordance with the invention described in my copending application, connections between the ends of bodies such as cables are made by inserting the ends of the bodies in a tubular casing, which casing is then subjected to a drawing or rolling operation to effect an intimate engagement between the casing and the bodies to be connected.

An object of the present invention is to provide a simple and efficient device for use in connecting the ends of bodies such as cables. An object is to provide a device for effecting the contraction of a tubular sleeve into engagement with the end of a body such as a cable and the concurrent flow of the material of the sleeve along the cable or the like. A further object is to provide a device for drawing down a tubular casing which is placed over the end of a body such as a cable. More specifically, an object is to provide a portable metal-drawing device for use in making connections between the ends of bodies such as cables.

These and other objects of the invention will be apparent from the following description when taken in connection with the accompanying drawings, in which—

Fig. 1 is a central longitudinal section showing one embodiment of the invention with the cable ends and sleeve positioned therein.

Fig. 2 is a plan view of the device, and

Fig. 3 is a section on line 3—3 of Fig. 1, showing a draw carriage and associated elements.

In the drawings, the numeral 1 indicates the skeleton frame in which are mounted bushings 2, 2 for rotatably supporting a spindle having right-hand and left-hand threaded portions. 3, 4, respectively. One or both ends 5 of the spindle are made of square or other non-circular cross-section to receive an operating crank or wrench.

On the spindle 3, 4 are mounted carriages 6, 7, respectively, which are guided by rods 8 extending parallel to the spindle between the ends of the frame 1. The carriages 6, 7 form the supports for socket members 9, 10, respectively, which preferably consist of two parts separable upon a horizontal plane to receive the respective draw plates 11, 12, which plates likewise consist of two parts separable in a longitudinal plane. The top caps of the socket members may be clamped to the respective base sections by bolts 13, 14.

As shown in Figs. 1 and 3, the adjacent ends of a stranded cable C are in position to be joined by drawing the tubular casing S into which the ends of the cable have been inserted. The sleeve S is preferably provided with a reduced central portion having a diameter somewhat less than the diameter of the openings in the die plates 11, 12. The sleeve S is placed in the device by loosening the clamp bolts 13, 14 to permit the separation of the two-part die plates and sockets. The bolts are then tightened and the ends of the cable are slipped into the ends of the sleeve S. The spindle is then rotated by means of a crank or wrench applied to the squared end 5, and the carriages 6, 7 move in opposite directions along the frame 1 to compress the sleeve radially while extending it along the cable ends.

The bodies to be connected may be similar or dissimilar as to their cross-section and composition. In any given case, the draw plates 11, 12 which are used have openings of such size and shape as to produce the desired flow of the casing material into intimate engagement with the members to be joined.

It will be noted that each draw plate acts as an abutment to hold the sleeve S against the pull of the other draw plate, and that it is not necessary to clamp the cables to prevent the separation of their ends during the drawing of the sleeve.

While I have illustrated a device having oppositely movable draw plates for simultaneously drawing both ends of the sleeve, it will be apparent that but one moving carriage may be provided, if desired. The embodiment illustrated is particularly adapted for use in the field as it is small and of relatively light weight. For shop or factory use, the threaded spindle may be operated by power, if desired. It will be apparent that these and many other changes which may be made in the several parts, their relative size, shape and location fall within the scope of my invention as set forth in the following claims.

I claim:—

1. Apparatus for drawing a tubular casing upon the ends of bodies such as cables, comprising a frame, a draw plate, a spindle for moving said draw plate, and means on said frame for engaging the tubular casing to take the thrust established therealong by the movement of said draw plate.

2. Apparatus for drawing a tubular casing upon the abutting ends of bodies such as cables, including two draw plates and means for simultaneously operating the draw plates in relatively opposite directions.

3. Apparatus for drawing a tubular casing upon the abutting ends of bodies such as cables, including a spindle provided with right and left hand threads running in opposite directions from a common point, a frame revolubly supporting the spindle, carriages on the spindle travelling in opposite directions and a draw plate supported on each carriage.

4. Apparatus for drawing a tubular casing upon the abutting ends of bodies such as cables, including two draw plates, each composed of two longitudinally divided parts, a holder for each draw plate composed of two longitudinally divided parts and means for simultaneously moving the holders in relatively opposite directions.

In testimony whereof, I affix my signature.

ALFRED JOHANN AUSPITZER.